Patented Nov. 23, 1948

2,454,663

UNITED STATES PATENT OFFICE 2,454,663

FLUORODIHALO ESTERS

Lawrence McGinty, Frodsham, Nr. Warrington, Cheshire, England, assignor to Imperial Chemical Industries Limited, a corporation of Great Britain No Drawing. Application April 5, 1946, Serial No. 659,860
In Great Britain April 9, 1945

2 Claims. (Cl. 260—487)

1

This invention relates to the production of unsaturated acids and esters containing fluorine and polymers thereof, and more particularly to the production of monomeric and polymeric fluoroacrylates.

The production of certain substituted unsaturated aliphatic acids and esters has previously been described, for example the production of alpha-chloroacrylic acid and its esters is described in British patent specification No. 514,619. It is also known that compounds of this type, such as chloroacrylic and methacrylic acids and their esters, can readily be polymerised to give transparent resin-like solids, useful for the manufacture of a wide variety of articles.

According to the present invention, a process for the production of alpha-fluoroacrylic acid or an alkyl ester thereof comprises reacting with nascent hydrogen an alkyl ester of a fluorodihalo propionic acid of the type $$CH_2X'.CX''F.COOH$$

where X' and X'' are halogen other than fluorine and may be the same or different halogens. According to a further feature of the invention, the said fluorodihalo propionic ester is prepared by treating a trihalopropionic ester of the type $CH_2X.CX_2.COOR$, where X is halogen other than fluorine and the three halogen atoms may be the same or different halogens and R is an alkyl radical, with a fluorinating agent at a temperature above 100° C. According to a still further feature of the invention, a polymer of alpha-fluoroacrylic acid or an ester thereof is obtained by subjecting the corresponding monomer to the action of heat, ultraviolet radiation or of a polymerisation catalyst.

The reaction of nascent hydrogen with an alkyl ester of a fluorodihalo propionic acid according to the invention results in the elimination of two atoms of halogen from adjacent carbon atoms of the ester molecule, with consequent formation of the alpha-fluoroacrylic ester. The nascent hydrogen employed for the reduction is produced in situ, suitably by the action of a dilute mineral acid or a lower aliphatic alcohol on a finely divided metal such as zinc. For example, methyl alpha-fluoroacrylate may be produced by treating methyl 1-fluoro-1-chloro-2-bromopropionate with zinc dust and methanol or acidified water at an elevated temperature. Advantageously the temperature is such that the mixture of fluoroacrylate and water distils off at a steady rate. Alpha-fluoroacrylic acid may be obtained by acid

2 or alkaline hydrolysis of the alkyl alpha-fluoroacrylate produced by the reduction step.

The fluorination of a trihalopropionic ester of the type specified above, to give the fluoro-dihalopropionic ester, may be effected by means of any of the metallic fluorides commonly employed as fluorinating agents, such as antimony trifluoride or mercuric fluoride. The preferred fluorinating agent is mercuric fluoride, and the fluorination is carried out at a temperature above 100° C., the actual reaction temperature varying according to the compound fluorinated. For example, methyl 1-chloro-1,2-dibromopropionate, when heated at a temperature of approximately 140° C. with mercuric fluoride, is converted into methyl 1-fluoro-1-chloro-2-bromopropionate, which is a novel compound and is a suitable intermediate for the production of methyl alpha-fluoroacrylate and alpha-fluoroacrylic acid by the method of the present invention. The trihalopropionic esters may be prepared by the addition of halogen to chloroacrylates.

In one form of the invention, in which the process is applied to the production of methyl alpha-fluoroacrylate, methyl 1-chloro-1,2-di-bromopropionate is mixed with mercuric fluoride in a vessel fitted with a fractionating column leading to a condenser and a receiver. The mixture is heated, suitably at reduced pressure, to approximately 140° C., at which temperature a brisk reaction begins. The fluorinated propionate is distilled off as it is formed, and may be redistilled if desired, or the crude ester may be employed for the reduction stage of the process. The latter stage is carried out by gradually adding the methyl 1-fluoro-1-chloro-2-bromopropionate to a heated mixture of zinc dust and acidified water, with vigorous stirring, which is continued after the addition is completed. The temperature of the reaction mixture and the rate of addition of the ester are controlled so that a mixture of methyl alpha-fluoroacrylate and water distils at a steady rate, the distillation temperature being between 80° C. and 90° C., and rising further towards the end of the reaction. The distillate consists of two layers, and the crude methyl alpha-fluoroacrylate is separated from the aqueous layer and dried, and may be purified by fractional distillation.

The fluorination of the chlorodibromopropionate may be carried out at either atmospheric or reduced pressure. It is essential that the reagents should be thoroughly mixed, otherwise there is a tendency for the reaction to start with great violence after an initial delay. Good mixing may be ensured by carrying out the reaction under reduced pressure, for example at pressures of the order of 100 mm. of mercury, so that the chlorodibromopropionate is boiling steadily before the reaction begins. If the fluorination is carried out at atmospheric pressure, means for stirring the reaction mixture must be provided. A further advantage of employing reduced pressure is that the ester then distils off as it is formed, while the reaction temperature can be maintained at approximately 140° C.

Alpha-fluoroacrylic acid and its esters, produced by the process of the present invention, are novel compounds. They have an odour similar to that of acrylic acid and its esters and, unlike the chloroacrylates, have very little lachrymatory action. They may be polymerised to give new polymeric resin-like products. Polymerisation takes place slowly at room temperature, and is accelerated as the temperature is raised. Thus, in the case of methyl alpha-fluoroacrylate, the monomer becomes very viscous after five or ten minutes at 60° C. Polymerisation takes place rapidly and exothermically at elevated temperatures or under the influence of ultraviolet light or the usual polymerisation catalysts such as benzoyl peroxide. The polymers obtained are clear, transparent, colourless solids having lower refractive indices than the corresponding methacrylates; for example, the refractive index of polymethyl methacrylate is 1.4900, and that of polymethyl fluoroacrylate is 1.4565. In order to obtain a polymer of the best quality, it is preferable to purify the crude fluorodihalopropionate by redistillation before carrying out the reduction thereof to alpha-fluoroacrylate monomer.

The fluorodihalopropionates, prepared as described above and used as intermediates for the production of alpha-fluoroacrylates according to this invention, are also novel compounds.

The following example illustrates but does not limit the invention, all parts being by weight.

*Example*

800 parts of methyl 1-chloro-1,2-dibromo-propionate, prepared by reacting bromine with methyl alpha-chloroacrylate, and 325 parts of mercuric fluoride were mixed in a reaction vessel fitted with a fractionating column leading to a water-cooled condenser and receiver. The pressure of the system was reduced to 100 mm. and the vessel was heated, a vigorous reaction starting when the external temperature of the reaction vessel had reached 150° C. The heating was stopped until the initial violence of the reaction had abated, and was then restarted and continued for a further period of four hours. The methyl 1-fluoro-1-chloro-2-bromopropionate distilled at 110° C. to 120° C., 530 parts of crude product being obtained. This crude material was purified by washing first with dilute hydrochloric acid, then with water, drying by means of calcium chloride and fractionating under reduced pressure. The purified methyl 1-fluoro-1-chloro-2-bromoproprionate thus obtained boiled over the range 59° C. to 62° C. at 16 mm. pressure, and had a density, $D_4^{25}=1.6896$; refractive index, $n_D^{25}=1.4560$; and molecular refraction, 34.5, the theoretical molecular refraction being 34.9.

150 parts of zinc dust, 400 parts of water and 63 parts of 2N sulphuric acid were placed in a reaction vessel fitted with a stirrer, an inlet for liquid and a fractionating column which was attached to a water-cooled condenser. The vessel was heated, and 360 parts of the methyl 1-fluoro-1-chloro-2-bromopropionate were added gradually, with vigorous stirring, over a period of two hours. The temperature of the reaction mixture and the rate of addition of the ester were controlled so that the mixture of methyl alpha-fluoroacrylate and water distilled at a steady rate, the distillation temperature being 84° C. to 88° C. Stirring was continued after completion of the addition until the temperature of distillation had risen to 97° C. and the process was then stopped. The distillate formed two layers, and the crude methyl alpha-fluoroacrylate was separated from the aqueous layer and dried by treating with sodium sulphate. The crude product, which amounted to 170 parts, was purified by two fractionations, and the final product was a water-white liquid having the following properties: boiling range 90.5° C. to 91.75° C. at 765 mm. pressure; refractive index $n_D^{20}$, 1.3869; specific gravity $D_4^{20}$, 1.111; molecular refraction 22.2 (theoretical M. R.=21.75). Analysis gave carbon 46.1%, hydrogen 5.6%, fluorine 18.9%; (theoretical for $C_4H_5O_2F$: carbon 46.1%, hydrogen 4.8%, fluorine 18.2%).

The monomeric methyl alpha-fluoroacrylate, prepared as described above, was polymerised by irradiation with ultraviolet light at 25° C. The polymer was obtained as a very clear, transparent, colourless mass, with the following properties: specific gravity at 15° C., 1.38; refractive index $n_D^{20}$, 1.4565; dispersion $$\frac{n_D-1}{n_F-n_C} \cdot 51$$

Brinell hardness, 20.7 and 20.4 for a flat and a curved surface respectively. Analysis of the polymer gave carbon 45.7%, hydrogen 4.8%, fluorine 17.6%.

I claim:

1. New chemical compounds of the general formula $CH_2X' \cdot CX''F \cdot COOCH_3$ wherein $X'$ and $X''$ are radicals from the group consisting of bromine and chlorine.

2. As a new chemical compound, methyl 1-fluoro-1-chloro-2-bromopropionate, having a boiling range of 59° C. to 62° C. at 16 mm. pressure, a density $D_4^{25}$ of 1.6896, and a refractive index $n_D^{25}$ of 1.4560.

LAWRENCE McGINTY.

REFERENCES CITED

The following references are of record in the file of this patent:

UNITED STATES PATENTS

| Number | Name | Date |
|---|---|---|
| 2,042,458 | Crawford | June 2, 1936 |
| 2,318,959 | Muskat | May 11, 1943 |
| 2,405,894 | Lichty | Aug. 13, 1946 |
| 2,413,716 | Kenyon | Jan. 7, 1947 |